(12) United States Patent
Wu et al.

(10) Patent No.: US 8,078,437 B2
(45) Date of Patent: Dec. 13, 2011

(54) UPSCALING RESERVOIR MODELS BY REUSING FLOW SOLUTIONS FROM GEOLOGIC MODELS

(75) Inventors: Xiao-Hui Wu, Sugar Land, TX (US); Rossen R. Parashkevov, Houston, TX (US); Matt T. Stone, Rosharon, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 304 days.

(21) Appl. No.: 12/306,237

(22) PCT Filed: May 16, 2007

(86) PCT No.: PCT/US2007/011774
§ 371 (c)(1), (2), (4) Date: Dec. 22, 2008

(87) PCT Pub. No.: WO2008/008121
PCT Pub. Date: Jan. 17, 2008

(65) Prior Publication Data
US 2009/0306945 A1    Dec. 10, 2009

Related U.S. Application Data

(60) Provisional application No. 60/819,186, filed on Jul. 7, 2006.

(51) Int. Cl.
*G06F 7/60* (2006.01)
*G06F 17/10* (2006.01)

(52) U.S. Cl. .................... 703/2; 703/9; 703/10; 703/5

(58) Field of Classification Search ............ 703/5, 9–10, 703/2
See application file for complete search history.

(56) References Cited

U.S. PATENT DOCUMENTS

| 5,835,883 A | 11/1998 | Neff et al. |
| 6,052,520 A | 4/2000 | Watts, III |
| 6,094,619 A | 7/2000 | Noetinger et al. |
| 6,106,561 A | 8/2000 | Farmer |
| 6,662,109 B2 | 12/2003 | Roggero et al. |
| 6,823,297 B2 | 11/2004 | Jenny et al. |
| 6,826,483 B1 | 11/2004 | Anderson et al. |
| 6,826,520 B1 | 11/2004 | Khan et al. |

(Continued)

FOREIGN PATENT DOCUMENTS

| WO | WO 00/79423 A1 | 12/2000 |
| WO | WO 2004/095259 | 11/2004 |

OTHER PUBLICATIONS

John Trangenstein "Multi-Scale Iterative Techniques and Adaptive Mesh Refinement for Flow in Porous Media", Elsevier 2002.*

(Continued)

*Primary Examiner* — Saif Alhija
(74) *Attorney, Agent, or Firm* — ExxonMobil Upstream Research Company law Dept.

(57) ABSTRACT

Method is provided for simulating a physical process such as fluid flow in porous media by performing a fine-grid calculation of the process in a medium and re-using the fine grid solution in subsequent coarse-grid calculations. For fluid flow in subsurface formations, the method may be applied to optimize upscaled calculation grids formed from geologic models. The method decreases the cost of optimizing a grid to simulate a physical process that is mathematically described by the diffusion equation.

19 Claims, 4 Drawing Sheets

U.S. PATENT DOCUMENTS

| | | | |
|---|---|---|---|
| 6,842,725 | B1 | 1/2005 | Sarda |
| 6,907,392 | B2 | 6/2005 | Bennis et al. |
| 6,922,662 | B2 | 7/2005 | Manceau et al. |
| 6,941,255 | B2 | 9/2005 | Kennon et al. |
| 7,043,413 | B2 | 5/2006 | Ward et al. |
| 7,047,165 | B2 | 5/2006 | Balaven et al. |
| 7,096,122 | B2 | 8/2006 | Han |
| 7,260,508 | B2 | 8/2007 | Lim et al. |
| 7,340,385 | B2 | 3/2008 | James |
| 7,369,973 | B2 | 5/2008 | Kennon et al. |
| 2003/0216898 | A1 | 11/2003 | Basquet et al. |
| 2005/0010383 | A1 | 1/2005 | LeRavalec-Dupin et al. |
| 2005/0177354 | A1 | 8/2005 | Jenny et al. |
| 2005/0203725 | A1 | 9/2005 | Jenny et al. |
| 2005/0234690 | A1 | 10/2005 | Mainguy et al. |
| 2005/0273303 | A1 | 12/2005 | Flandrin et al. |
| 2006/0041410 | A1 | 2/2006 | Strebelle |
| 2006/0047489 | A1 | 3/2006 | Scheidt et al. |

OTHER PUBLICATIONS

Peaceman, Donald W:, "Effective Transmissibilities of a Gridblock by upscaling—comparison of direct methods with renormalization". SPE Journal Sep. 1997 Soc of Petroleum Engineers Journal, Brookfield, CT, vol. 2 No. 3, Sep. 1997, pp. 338-349, XP002405323.

Renard, Ph, and de Marsily, G., "Calculating Effective Permeability: A Review," *Advances in Water Resources*, 20 (1997), 253-278.

Stern, D., and Dawson, A. G., "A Technique for Generating Reservoir Simulation Grids to Preserve Geologic Heterogeneity", SPE 51942, Presented at the 1999 SPE Reservoir Simulation Symposium held in Houston, Texas Feb. 14-17, 1999.

Stern, D., "Practical Aspects of Scaleup of Simulation Models," *JPT* (Sep. 2005) 74.

Trangenstein, J. A., Multi-scale iterative techniques and adaptive mesh refinement for flow in porous media, *Advances in Water Resources* 25 (2002) 1175-1213.

Watts, J. W. and Shaw, J.S., "A New Method for solving the Implicit Reservoir Simulation Matrix Equation", SPE 93068, Presented at the 2005 SPE Reservoir Simulation Symposium held in Houston, Texas Jan. 31-Feb. 2, 2005.

Wen, X.H., and Gomez-Hernandez, J.J., "Upscaling Hydraulic Conductivities in Heterogeneous Media," *Journal of Hydrology*, 183 (1996), 9-32.

White, C.D. and Horne, R.N., "Computing Absolute Transmissibility in the Presence of Fine-Scale Heterogeneity," paper SPE 16011, Ninth SPE Symposium on Reservoir Simulation, Society of Petroleum Engineers, 209-220 (1987).

Wu, X. H., Efendiev, Y.and Hou, T.Y. "Analysis of Upscaling Absolute Permeability," *Discrete and Continuous Dynamical Systems-Series B*, 2 (2002), 185-204.

"Application of Global upscaling techniques in the presence of isolated flow units". Disclosure 503014; ResearchDisclosure.com, Mar. 2006/231, Mar. 2006 No. 503; ISSN0374-4353.

International Search Report for PCT/US07/11774, Sep. 19, 2008.

Chen, Y. et al:, "A coupled local-global upscaling approach for simulating flow in highly heterogeneous formations". *Advances in Water Resources*, Oct. 2003, vol. 26, No. 10, pp. 1041-1060, XP002405325.

Christie, M.A. et al:, "Tenth SPE Comparative Solution Project: A Comparison of Upscaling Techniques". *SPE Reservoir Simulation Symposium in Houston*—Proceedings 2001, pp. 1-13, XP002405322.

Diyankov, O.V. et al., "SparSol—sparse linear systems solver". *J. Numer. Math*, vol. 0, No. 0, pp. 1-13 (2006).

Durlofsky, L. J, "Upscaling and Gridding of Fine Scale Geological Models for Flow Simulation," *Proceedings of the 8th International Forum on Reservoir Simulation* (Jun. 20-24, 2005), Stresa, Italy.

Durlofsky, L. J. et al., "Application of a new scale up methodology to the simulation of displacement processes in heterogeneous reservoirs." *Proc. SPE Int. Petrol. Conf. Exhib. Mex. 1994, Society of Petroleum Engineers (SPE)*, Richardson, TX, USA, 1994, pp. 365-375, XP002405324.

Farmer, C. L., "Upscaling: A Review." *Numerical Meth. Fluids*, 40; 63-78, (2002).

He, C. "Structured Flow-based Gridding and Upscaling for Reservoir Simulation," *Ph.D. Thesis* (2004), Stanford University, Stanford, CA pp. 34-39, 118-125.

\* cited by examiner

UPSCALING RESERVOIR MODELS BY REUSING FLOW SOLUTIONS FROM GEOLOGIC MODELS

This application is the National Stage of International Application No. PCT/US2007/011774, filed 16 May 2007, which claims the benefit of U.S. Provisional Application No. 60/819,186, filed 7 Jul. 2006.

FIELD OF THE INVENTION

This invention relates generally to the field of generating numerical models for computer simulation of diffusive processes (processes described mathematically by the diffusion equation), such as fluid flow in porous media. More particularly, a method of upscaling from a fine-scale geologic model of an underground formation to a set of grids suitable for computer simulation is provided.

BACKGROUND OF THE INVENTION

Computer simulation of fluid flow in porous media is widely used in the oil industry, in hydrology, and in environmental studies for remediation of contaminated groundwater. Simulation predictions often have a significant impact on the economic valuation of assets, plans for depletion of hydrocarbon assets and government policies.

Hydrocarbon deposits, such as oil and gas, are found in nature in complex underground structures known as "reservoirs." Reservoirs are comprised of various types of porous media (rocks) with different physical properties, such as porosity and permeability. These properties may vary widely over short distances. Fluid flow in a reservoir is determined by the physical properties.

The development of stochastic geologic property modeling techniques by geologists has allowed modelers to create subsurface models with a tremendous amount of data, which is represented in a three-dimensional "grid" that overlays the subsurface volume. It is not practical to perform reservoir simulations for the various situations of interest at geologic model scale, because of the large number of cells in the geologic model grid. Also, complex property distributions have made simple permeability averaging techniques obsolete. Therefore, "upscaling" (the formation of coarser grids for flow calculations) has become an integral part of reservoir simulation.

Assembling data describing rock properties and geologic structures is a crucial step toward accurate simulations of fluid flow in reservoirs. The geo-cellular models that assemble the data include rock properties (e.g., porosity and permeability) defined in each cell. The geologic cells form a non-overlapping partition of a reservoir.

The geo-cellular model may include millions of geologic cells to describe a reservoir, so direct simulation of reservoir fluid movement for the many cases of interest is cost-prohibitive. Thus, from an economic standpoint it is necessary to transform a detailed geologic model into a coarse simulation model with fewer degrees of freedom, so that reservoir simulation can be performed at an acceptable cost. This transformation is called both "scaleup" and "upscaling." Recent reviews of scaleup have been published by D. Stern ("Practical Aspects of Scaleup of Simulation Models," J. Pet. Tech., September 2005, pp. 74-82) and L. J. Durlofsky ("Upscaling and Gridding of Fine Scale Geologic Models for Flow Simulation," paper presented at $8^{th}$ Int'l Forum on Reservoir Simulation, Stressa, Italy, June, 2005) (See: http://ekofisk.stanford.edu/faculty/durlofskypub12.html).

Upscaling involves building a simulation grid that is coarser than the geologic grid and converting properties defined on the geologic grid to the simulation grid. Once a simulation grid is defined, converting geologic properties typically requires that certain averages of the geologic properties be calculated to populate the simulation grid. For some of the properties, such as porosity, simple averages with suitable weights are sufficient. To scaleup permeability, flow-based averaging procedures have proven to be the best way. Durlofsky (2005) reviews such procedures and a recent mathematical analysis of flow-based permeability-scaleup is given by Wu et al. ("Analysis of Upscaling Absolute Permeability," Discrete and Continuous Dynamical Systems—Series B, Vol. 2, No. 2, 2002).

Flow-based scaleup requires solving single-phase Darcy flow equations on a fine-scale grid. Most of the existing methods require the fine grid to be aligned with the coarse simulation grid. Recently, a method of upscaling simulation grid transmissibility using flow solutions defined on a fine grid that is not aligned with the simulation grid was described by He (C. He, "Structured Flow-based Gridding and Upscaling for Reservoir Simulation," PhD Thesis, Stanford University, Stanford Calif., December, 2004). White and Horne present an algorithm to compute scaled-up values of transmissibility when there is permeability heterogeneity and anisotropy at the fine-grid scale ("Computing Absolute Transmissibility in the Presence of Fine-Scale Heterogeneity," paper SPE 16011, Ninth SPE Symposium on Reservoir Simulation, Society of Petroleum Engineers, 209-220 (1987)).

As discussed by Stern (2005) and Durlofsky (2005), a successful scaleup often requires a simulation grid that is capable of capturing correlated heterogeneities directly. An iterative procedure is often required, which involves building multiple simulation grids to determine the "optimum" grid. This process is called grid optimization. Building multiple simulation grids requires repeated scaleup of the geologic model. For permeability scaleup, generating flow solutions on a fine-scale grid is the most time-consuming and costly step. Due to its high cost, automatic grid optimization is not feasible; in fact, even manual changes of simulation grids are seldom done in practice. As a result, simulation models often do not have the best accuracy, and they may produce predictions that are not consistent with the geologic models. What is needed is a method that allows faster and lower cost grid optimization.

SUMMARY OF INVENTION

This invention provides faster and lower cost grid optimization during scaleup. A key feature of the invention is to reuse flow solutions computed directly on the geologic models and thereby to avoid repeating this most computationally intensive part of the scaleup process. These flow solutions are repeatedly used to scale up permeability for different simulation grids. By reusing the flow solutions, the scaleup of different simulation grids can be performed more efficiently. Thus, manual change of simulation grids is no longer prohibitively time-consuming, and automatic grid optimization can become a reality. The method may be used when the physical model is described by linear partial differential equations or when the physical problem may require a mathematical model based on non-linear equations, as in the case of multi-phase fluid flow in porous media.

A computer-implemented method for scale-up of a physical property of a region of interest from a fine-scale grid where values of the property are known to multiple coarse grids, said property being associated with a diffusive process in the region of interest, said method comprising:

(a) selecting a volume of the region of interest, said volume being at least a portion of the region of interest;

(b) subdividing the volume into a plurality of fine grid cells to form a fine-scale grid for the volume, and obtaining a value of the physical property for each of the plurality of fine grid cells;

(c) solving a diffusion equation representing a diffusive process on the fine-scale grid over the selected volume, using the fine-scale values of the physical property, thus generating a global solution;

(d) saving the global solution;

(e) subdividing the selected volume into a first coarse grid having at least one coarse grid cell, wherein the plurality of fine grid cells is greater than the at least one coarse grid cells;

(f) selecting a coarse-grid cell, and determining which of the plurality of fine grid cells are included, in whole or in part, in the selected coarse grid cell, using a pre-selected criterion for partial inclusion;

(g) calculating a scaled-up value of the physical property for the selected coarse grid cell by retrieving and using the global solution for the fine grid cells included within the selected coarse-grid cell;

(h) repeating steps (f)-(g) to calculate scaled-up values of the physical property for at least one other coarse grid cell selected from the at least one coarse grid cell in the selected volume of the region of interest; and (i) repeating steps (e)-(h) for at least one more coarse grid, using the global solution for each coarse grid.

In some embodiments of the invention, the global solution is generated by sub-dividing the selected volume into two or more parts which may overlap, and solving the diffusion equation separately in each sub-volume, wherein the solutions are compatible between sub-volumes. Furthermore, the present inventive method does not have to be applied to scale up to a coarse grid, but instead may be used to scale up to two or more scale-up volumes of any description.

In another embodiment of the invention, a computer-implemented method for scaling a physical property of a subsurface region from values known at cells in a fine grid to multiple different cells, said property being associated with a diffusive process in the region is provided. The method for scaling includes: (a) selecting a volume of the subsurface region, said volume being at least a portion of the subsurface region; (b) subdividing the volume into fine scale cells to form a fine-scale grid for the volume, and obtaining a value of the physical property for each fine scale cell; (c) solving a diffusion equation on the fine-scale grid over the selected volume, thus generating a global solution, wherein the global solution is generated by sub-dividing the volume into two or more sub-volumes, solving the diffusion equation separately in each sub-volume, and matching the solutions at sub-volume boundaries; (d) saving the global solution in computer memory or data storage; (e) defining a different cell within one of the two or more sub-volumes, said different cell being different in size or shape than the fine scale cells; (i) determining which fine scale cells are included, in whole or in part, in the different cell, using a pre-selected criterion for partial inclusion; (g) calculating a scaled value of the physical property for the different cell by retrieving and using the global solution for the fine scale cells included within the different cell; and (h) repeating steps (e)-(g) to calculate a scaled value of the physical property for at least one more different cell in the selected volume of the subsurface region, using the global solution recalled from computer memory or data storage for each different cell.

In yet another alternative embodiment of the present invention, a method for producing hydrocarbons from a subsurface formation is provided. The method includes: obtaining a geologic model of the subsurface region, said model providing discrete values of a physical property of a medium for a fine-scale grid covering a selected volume constituting at least a part of the subsurface region; and obtaining a scaled-up model of the physical property suitable for use in a reservoir simulation program. The scaled-up model is made by: (i) solving a diffusion equation representing a diffusive process on the fine-scale grid over the selected volume, using the fine-scale values of the physical property, thus generating a global solution; (ii) saving the global solution in computer memory or data storage; (iii) subdividing the volume into a first coarse grid, said coarse grid having fewer cells than the fine-scale grid; (iv) selecting a coarse-grid cell, and determining which fine-grid cells are included, in whole or in part, in the selected coarse-grid cell, using a pre-selected criterion for partial inclusion; (v) calculating a scaled-up value of the physical property for the selected coarse-grid cell by retrieving and using the global solution for the fine-grid cells included within the selected coarse-grid cell; (vi) repeating steps (iv)-(v) to calculate scaled-up values of the physical property for selected other coarse-grid cells in the selected volume of the subsurface region; (vii) repeating steps (iii)-(vi) for at least one more coarse grid, using the global solution retrieved from computer memory or data storage for each coarse grid; and (viii) selecting a preferred coarse grid based on pre-determined grid optimization criteria. The method of producing further includes producing hydrocarbons from the subsurface region at least partially based on reservoir simulations made using the scaled-up model of the physical property on the preferred coarse grid.

In still another embodiment of the present invention, a method for scale-up of a physical property is provided. The method includes: (a) calculating fine-scale solutions to at least one equation describing the physics of a diffusive process in a media of interest, wherein the fine-scale solutions are determined for each fine-scale cell in a fine-scale grid and the fine-scale solutions are stored in a memory; (b) constructing a coarse grid for at least a portion of the media of interest, wherein the coarse grid comprises a plurality of cells; (c) forming at least one scaleup volume in the media of interest, wherein the scaleup volume is used to calculate the physics of a diffusive process in the media of interest on the coarse grid; (d) constructing a mapping between the set of fine-scale solutions and the at least one coarse grid, wherein the mapping comprises relating at least one fine-scale cell to one of the plurality of coarse grid cells; (e) retrieving the fine-scale solutions from the memory for each fine-scale cell relating to a coarse grid cell; (f) calculating an upscaled physical property for the coarse grid using the fine-scale solutions; (g) constructing at least one additional coarse grid for an additional portion of the media of interest, wherein the additional coarse grid comprises a plurality of cells; (h) iteratively repeating steps (c) to (f) for the at least one additional coarse grid using the fine-scale solutions from step (a).

BRIEF DESCRIPTION OF THE DRAWINGS

The present invention and its advantages will be better understood by referring to the following detailed description and the attached drawings in which:

FIG. 4A shows traditional cell-based scaleup volumes, where the scaleup volumes are simply the coarse grid cells;

FIG. 4B shows a diamond-shaped scale-up volume for a horizontal connection designed to model the connection between two cells;

FIG. 4C shows a vertical-connection scale-up volume surrounding the connection between adjacent cells;

DETAILED DESCRIPTION OF PREFERRED EMBODIMENTS

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

Figure 1:
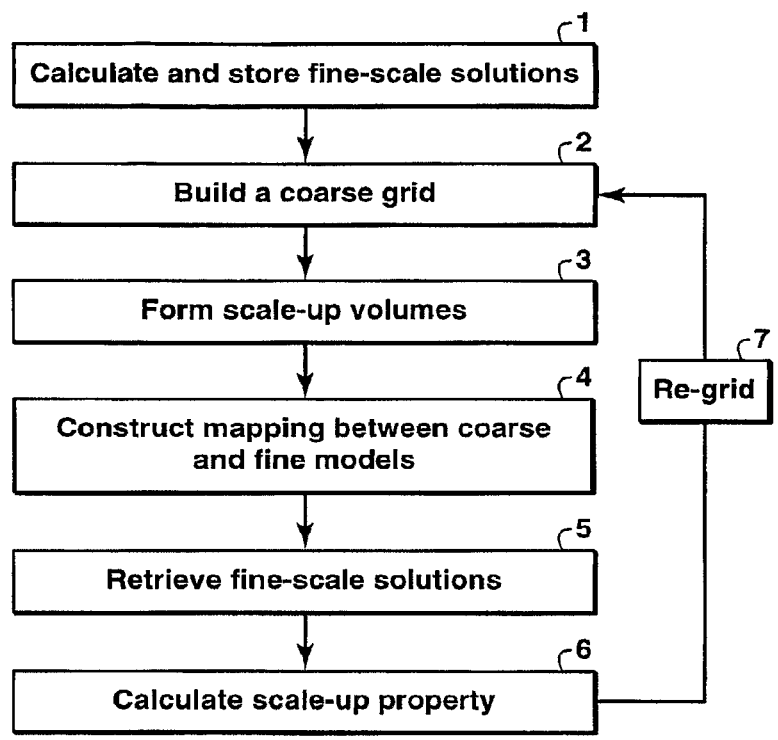
FIG. 1 shows a diagram of an exemplary method for upscaling physical properties.

The invention disclosed herein is a new scaleup process to allow the reuse of fine-scale (global) solutions for multiple coarse-scale grids. Referring to FIG. 1, the process includes the following steps:

Step 1. Calculate a set of fine-scale solutions to the appropriate equations describing the physics of a diffusive process in a region of interest. Linear pressure boundary conditions may be used for generating the flow solutions. Other boundary conditions can be used, as discussed by Wu et al. (2002).

Step 2. Construct a coarse grid suited to each region of interest.

Step 3. From this coarse grid, form scaleup volumes to calculate particular physical properties of interest on the coarse grid.

Step 4. Construct a mapping between the fine-scale model and the scaleup volumes.

Step 5. For each scaleup volume, retrieve the fine-scale solutions for each fine-scale cell that is associated with the scaleup volume through the mapping.

Step 6. Using these fine-scale solutions, calculate the upscaled property for each scaleup volume.

Step 7. Repeat steps 2 to 6 for a new coarse grid. To perform a scaleup on a new coarse grid, the fine scale solution is not recalculated. Rather, it is retrieved from a storage device, such as a computer memory or disc.

One difference between the approach disclosed herein and previous approaches is the ability to reuse the fine-scale (global) solutions on different coarse grids. Previous approaches calculate a fine-scale solution for each new coarse grid.

In one exemplary embodiment of the present invention, the upscaling of permeability in a model of Darcy flow through a porous media is described. It should be understood that though the method is applied to permeability and fluid flow, it is applicable to other physical processes described by the diffusion equation, which is:

$$a\frac{\partial u}{\partial t} + \nabla \cdot (\vec{b}u) + cu = \nabla \cdot (\underline{D}\nabla u),\quad [\text{Eq. 1}]$$

where a, $\vec{b}$, c, and $\underline{D}$ are known functions of space and time. The physical meaning of the coefficients depend on the context in which the equation is used. For Darcy flows, a is related to rock compressibility and porosity and $\underline{D}$ is the permeability tensor. The variable u in Eq. 1 is the unknown to be solved from the equation; it corresponds to pressure, saturation, or concentration in porous media flows.

Figure 2:
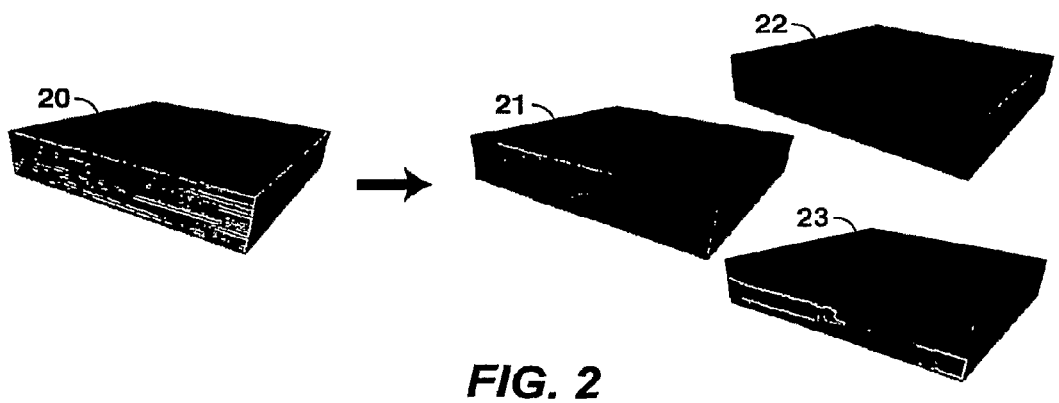
FIG. 2 illustrates a fine-scaled geologic model for performing flow calculations.

FIG. 2 demonstrates Step 1—the calculation of the fine-scale solutions for a model of fluid flow through porous media in three directions. Fine grid or geo-cellular model 20 includes rock properties of porosity and permeability for each cell. Results of flow calculations for three directions are illustrated at 21, 22 and 23. For the three dimensional ("3-D") model of Darcy flow, three solutions are necessary to calculate the upscaled permeability. These flow solutions can be calculated through any method desired, although often numerical methods such as finite difference or finite element are used, both of which are well known in the art of reservoir simulation. In this case, the region of interest is the entire model, but it may be desirable to divide the model into several regions to make the computations feasible. The solutions for the parts of the volume are combined through the use of appropriate boundary conditions to form a global solution covering the entire volume, i.e. the model or region of interest. The fine-scale solutions are then stored for later use.

The method disclosed herein will work in its most efficient mode if the fine grid is structured and orthogonal. Structured grids allow simpler and more efficient ways for manipulating the information compared to unstructured grids. In particular, the mapping algorithm used in Step 4 can be simplified and made more efficient. If the fine grid is both structured and orthogonal, one can take advantage of simpler and more efficient methods for obtaining the solution to the physical problem. The importance of these considerations rapidly increases with the number of cells (i.e. the resolution) of the fine grid, especially in 3-D applications.

As stated previously, if the size of fine grid representation of the physical process is so big that it becomes impractical to compute the solution on the entire model, then the model may be split into several regions and solutions may be obtained on each region separately. Preferably, regions overlap and the size of the regions will be chosen much bigger than the size of a coarse grid cell. Such choice will help reduce the effect of the boundary conditions on the local (regional) solutions and also will enable the regions to encompass features of larger scale (Wu et al. 2002). The coarse grid may also be an unstructured grid.

Figure 3A:
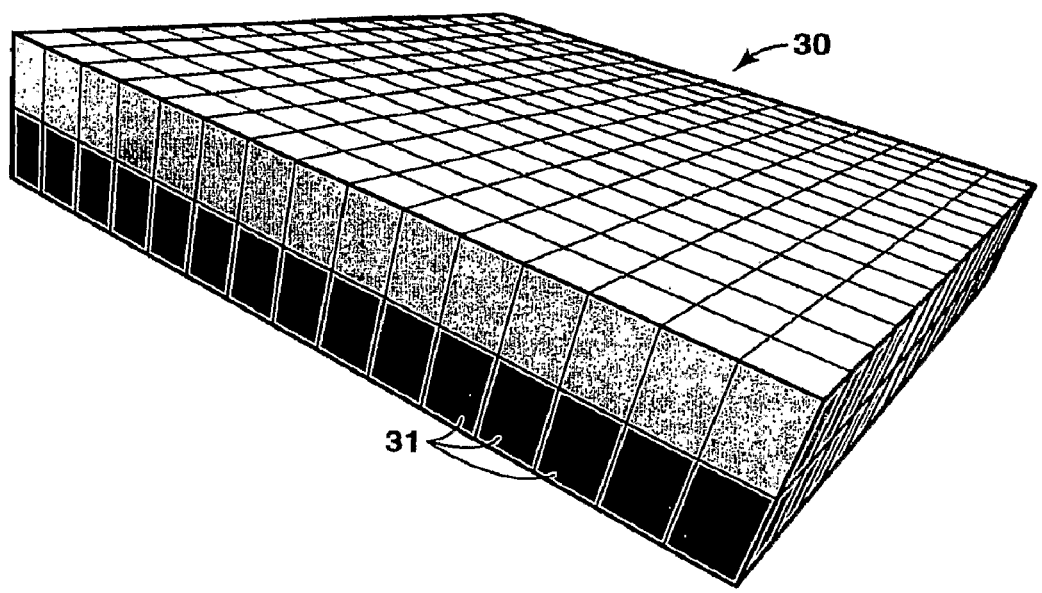
FIG. 3A illustrates a coarse structured grid having two layers.
Figure 3B:
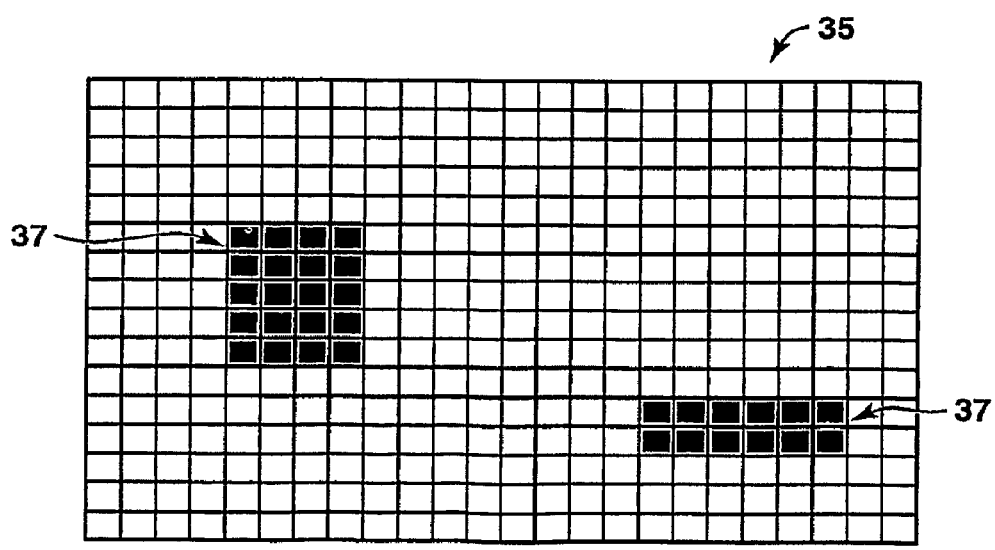
FIG. 3B shows a structured, orthogonal fine grid and coarse grid cells aligned with the fine grid.

FIGS. 3A-3B illustrate an embodiment of Step 2—construction of a coarse structured grid for the fine-scale geologic model shown in FIG. 2. In FIG. 3A, coarse grid 30 is made up of coarse grid cells 31, which could simply be defined as the union of a specific set of structured and orthogonal fine grid cells.

FIG. 3B shows a structured, rectangular fine grid 35 and two coarse grid cells 37 that are aligned with the fine grid 35. For this simple case, there exists an efficient discretization, namely the two-point flux finite volume approximation. Also, because of the grid structure, a solver will be more efficient. Since the coarse grid cells are aligned with the fine grid, the mapping between coarse and fine grids is trivial and will not produce sampling errors.

In Step 3, scaleup volumes are calculated for the coarse grid. The scale-up volumes are a particular volume of interest for the problem being solved. For reservoir simulations, these volumes are typically associated with coarse grid cells or connections.

Figure 4A:
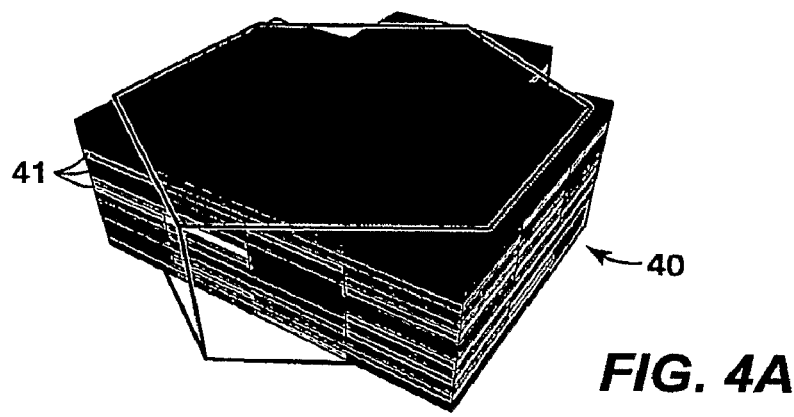
FIGS. 4A-4C illustrate unstructured scaleup volumes.
Figure 4B:
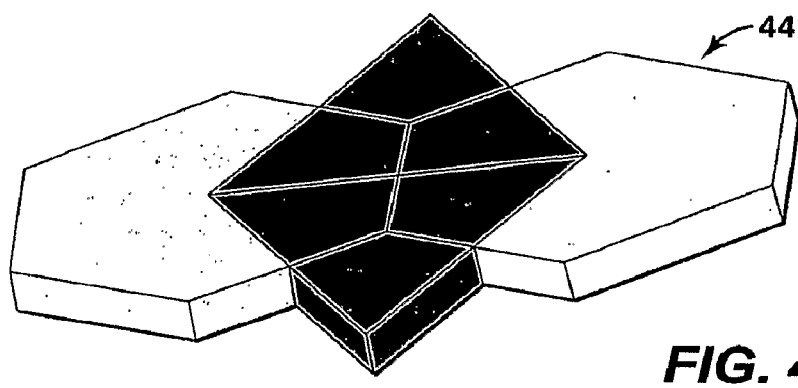
Figure 4C:
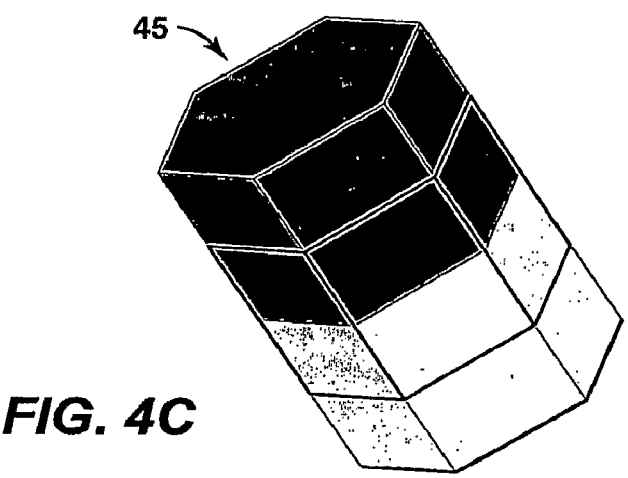

The methods of this invention work equally well for either structured or unstructured grids. FIGS. 4A-4C illustrate exemplary embodiments of Step 3—forming of scaleup volumes in a coarse unstructured grid. FIG. 4A shows traditional cell-based scaleup volume 40 and fine grid cells 41 within it. Coarse volume 40 within which the upscaled property is calculated is an approximation of the coarse grid cells. For a coarse unstructured grid with unstructured or Voronoi areal grid but a layered structure in the vertical dimension, if the finite difference method is used to obtain the flow solutions on the coarse grid, then the scale-up volumes 44 in FIGS. 4B and 45 in FIG. 4C are preferred. However, for the finite difference method on general unstructured grids, scale-up volumes based on cells or the unions of two neighboring cells can be used. The scaleup volume allows the direct calculation of the transmissibility, a key parameter in the finite difference method. The approach disclosed in U.S. Pat. No. 6,826,520 may be used to calculate transmissibility. Persons skilled in the art will know other approaches. For other numerical discretization schemes, different scale-up volumes may be required.

Figure 5A:
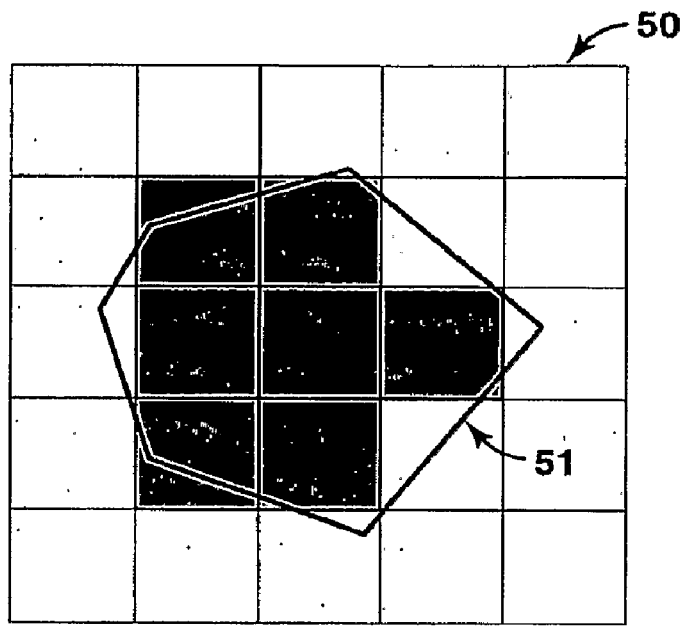
FIG. 5A illustrates an irregular coarse scaleup volume superimposed on a fine grid.
Figure 5B:
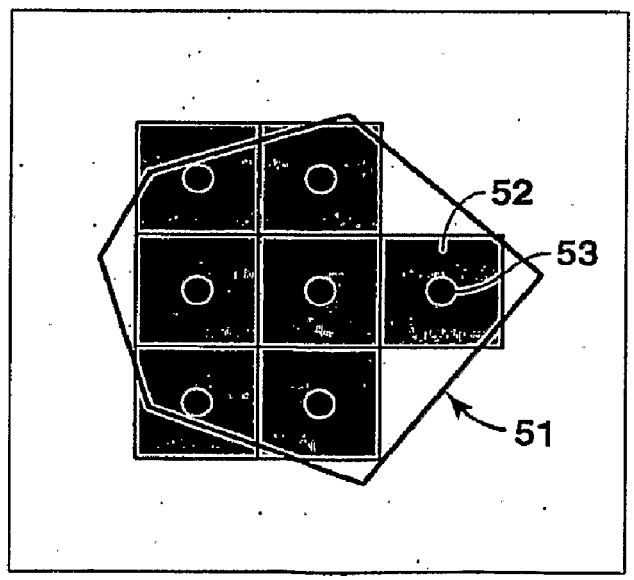
FIG. 5B illustrates that the centers of the fine grid cells may be used to associate a fine grid cell with a particular scaleup volume.

FIGS. 5A-5B illustrate an exemplary embodiment of Step 4—a mapping to determine which fine grid cells are associated with each scaleup volume. In FIG. 5A coarse scaleup volume 51 is shown superimposed on fine-scale grid 50. In FIG. 5B, a preferred method is depicted for determining if fine grid cell 52, for example, is associated with (i.e., will be considered to be included within) coarse scaleup volume 51. In this method, fine grid cell 52 is associated with scaleup volume 51 if its cell center 53 lies within the coarse scaleup volume 51. This method or criterion for partial inclusion is discussed in Durlofsky (2005) and in U.S. Pat. No. 6,826,520. Other methods may be used, as is known in the art. The mapping between the fine and coarse grid can be constructed in many different ways. For example, one could use geometric algorithms that are well known in the art of computational geometry and grid generation.

U.S. Pat. No. 6,106,561 teaches a suitable method for creating a grid. Other methods of gridding may be used, as is well known in the art. There are many references on the subject, such as the *Handbook of Grid Generation* (J. F. Thompson et al., CRC Press, 1999).

As an example of Step 6 of FIG. 1, the case of permeability of a porous medium, which is so important in the simulation of petroleum reservoirs to facilitate production of hydrocarbons from them, may be considered. In this case, both velocity and pressure gradient are components of the fine scale (i.e., global) solution for Darcy flow in porous media. Therefore, both pressure gradient and velocity are retrieved from data storage (Step 5) for each of the three solutions calculated in Step 1. For the permeability property of the Darcy flow equations, it has been shown by Wen and Gomez-Hernandez ("Upscaling Hydraulic Conductivity in Heterogeneous Media," *J Hydrology* 183, 9-32 (1996)) that the coarse grid permeability property can be represented by:

$$\langle \vec{v} \rangle = -\underline{K}^* \langle \nabla P \rangle ,$$ [Eq. 2]

where $\langle \vec{v} \rangle$ is the volume-weighted average of the fine-scale velocity in the scaleup volume, $\langle \nabla P \rangle$ is the volume weighted average of the fine-scale pressure gradient, and $\underline{K}^*$ is the coarse scale permeability. These averages are calculated for each flow solution. It should be noted that the velocity and pressure gradient are vectors and the permeability is represented as a tensor. This is why three different solutions are preferred; three solutions and three equations per solution (one for each component of the vector) allow the calculation of the nine components of the coarse-scale permeability tensor.

There are several methods for computing the coarse-grid effective property once the fine grid solution is available. These methods are discussed by Durlofsky (2005). A preferred method is to use the volume-average approach and Eq. 2.

If a new coarse grid is desired to improve performance, the fine-scale solution is not re-calculated in the present inventive method. As shown in FIG. 1, the scaleup volumes and their mapping to the fine grid must be reconstructed, and the fine scale solution is simply re-sampled on the new scaleup volumes defined based on the new coarse grid. Results of calculations with the new coarse grid can then be compared with results of calculations with the first coarse grid. Results of linear or single-phase flow calculations from the different coarse grids may be compared with the global flow solutions based on a geo-cellular model to select the preferred coarse grid. This process can be repeated until the most preferred coarse grid is found. The preferred coarse grid from these comparisons may then be used in a mathematical model based on non-linear equations, as in the case of multi-phase fluid flow in porous media.

Example 1

A fine grid calculation was performed using a geologic model having 14 million cells, of which 580,000 were active cells. A global solution for velocity and pressure was obtained for single phase Darcy flow within the model. Using one embodiment of the present inventive method, an initial scaleup to a coarse grid required 60 minutes computing time and, by retrieving and re-using results of the fine scale solution, only 7 minutes were required to scale up to a re-gridded model. In contrast, a typical method previously used required 125 minutes to scale up both the initial model and the re-gridded model. Both coarse grids had 40,500 active cells.

Example 2

A fine grid calculation was performed using a geologic model having 7.5 million cells, almost all of which were active. A global solution for velocity and pressure was obtained for single phase Darcy flow within the model. Using the present inventive method, an initial scaleup to a coarse grid required 390 minutes computing time and, by retrieving and re-using results of the fine scale solution, only 20 minutes were required to scale up to a re-gridded model. In contrast, methods previously used required 150 minutes to scale up both the initial model and the re-gridded model. Both coarse grids had 87,000 active cells.

The model size of Example 1 is more commonly encountered in current practice. For either size model, optimizing the methods disclosed herein will further improve the advantage in reduced time and cost over presently used methods. Using the disclosed methods, it is clear that the greatly reduced time required for re-gridded solutions makes practical a series of manually re-gridded solutions or the application of automatically re-gridded solutions.

Although the invention has been described in terms of scaling up simulation grids, it should be understood that the methods described herein apply equally well to sets of sample volumes that do not form grids, i.e., these volumes do not form a non-overlapping partition of the subsurface region. The sample volumes may be selected randomly or according to a regular pattern. The invention allows faster and lower cost determination of statistics from different sets of sample volumes. It should also be noted that the present inventive method does not require that the sample volume be larger than the fine-scale grid cells. The invention works equally for coarse grid cells (scaleup volumes) that are smaller than the fine-scale grid cells.

Although the invention has been described in terms of fluid flow in porous media, it should be understood that simulation of other physical phenomena described by the diffusion equation may also be practiced using the methods described herein. For example, thermal diffusion in solids and molecular diffusion in liquids may be simulated using the inventive method. In those cases, a physical property analogous to permeability may be upscaled from a fine grid calculation to a coarse grid calculation using the steps set out above.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

1. D. Stern, "Practical Aspects of Scaleup of Simulation Models," *JPT* (September, 2005) 74.
2. L. J. Durlofsky, "Upscaling and Gridding of Fine Scale Geological Models for Flow Simulation," *Proceedings of the 8th International Forum on Reservoir Simulation* (Jun. 20-25, 2005), Stresa, Italy.
3. Ph. Renard and G. de Marily, "Calculating Effective Permeability: A Review," *Advances in Water Resources,* 20 (1997), 253-278.
4. X. H. Wen and J. J. Gomez-Hernandez, "Upscaling Hydraulic Conductivity in Heterogeneous Media," *Journal of Hydrology,* 183 (1996), 9-32.
5. X. H. Wu, Y. Efendiev, and T. Y. Hou, "Analysis of Upscaling Absolute Permeability," *Discrete and Continuous Dyanmical Systems—Series B,* 2 (2002), 185-204.
6. S. A. Khan and A. G. Dawson, "Method of Upscaling Permeability for Unstructured Grids," U.S. Pat. No. 6,826,520, B1 (30 Nov. 2004).
7. C. He, "Structured Flow-based Gridding and Upscaling for Reservoir Simulation," *Ph. D. Thesis* (2004), Stanford University, Stanford, Calif.
8. M. de Berg, M. van Kreveld, M. Overmars and O. Schwarzkopf, "Computational Geometry: Algorithms and Applications," Springer, 1997.
9. P. G. Ciarlet, "The Finite Element Method for Elliptic Problems," North-Holland, 1978.
10. K. Aziz and A. Settari, "Petroleum Reservoir Simulation," Elsevier, 1979.
11. C. L. Farmer. "Simulation Gridding Method and Apparatus Including a Structured Areal Gridder Adapted for Use by a Reservoir Simulator." U.S. Pat. No. 6,106,561 (22 Aug. 2000).
12. J. F. Thompson, B. K. Soni, and N. P. Weatherill. "Handbook of Grid Generation." CRC Press, 1999.
13. C. D. White and R. N. Horne, "Computing Absolute Transmissibility in the Presence of Fine-Scale Heterogeneity," paper SPE 16011, Ninth SPE Symposium on Reservoir Simulation, Society of Petroleum Engineers, 209-220 (1987).

The invention claimed is:

1. A computer-implemented method for scale-up of a physical property of a region of interest from a fine-scale grid where values of the property are known to multiple coarse grids, said property being associated with a diffusive process in the region of interest, said method comprising:
   (a) selecting a volume of the region of interest, said volume being at least a portion of the region of interest;
   (b) subdividing the volume into a plurality of fine grid cells to form a fine-scale grid for the volume, and obtaining a value of the physical property for each of the plurality of fine grid cells;
   (c) using a computer, solving a diffusion equation representing a diffusive process on the fine-scale grid over the selected volume, using the fine-scale values of the physical property, thus generating a global solution;
   (d) saving the global solution;
   (e) subdividing the selected volume into a first coarse grid having at least one coarse grid cell, wherein the plurality of fine grid cells is greater than the at least one coarse grid cells;
   (f) selecting a coarse-grid cell, and determining which of the plurality of fine grid cells are included, in whole or in part, in the selected coarse grid cell, using a pre-selected criterion for partial inclusion;
   (g) calculating a scaled-up value of the physical property for the selected coarse grid cell by retrieving and using the global solution for the fine grid cells included within the selected coarse-grid cell;
   (h) repeating steps (f)-(g) to calculate scaled-up values of the physical property for at least one other coarse grid cell selected from the at least one coarse grid cell in the selected volume of the region of interest; and
   (i) repeating steps (e)-(h) for at least one more coarser grid, using the global solution for each coarser grid.

2. The method of claim 1, wherein three independent flow solutions of the diffusion equation are obtained for the global solution, thus permitting fine-scale grid computation of one or more vector quantities from the global solution.

3. The method of claim 2, wherein the one or more vector quantities are pressure gradient and velocity.

4. The method of claim 3, wherein the physical property is permeability of a porous medium, and the diffusive process is fluid flow in the porous medium.

5. The method of claim 4, wherein a scaled-up value for a permeability tensor is obtained by computing an average value for each component of pressure gradient and velocity in the selected coarse-grid cell, said averages being weighted by fine-grid cell volume, and then solving for coarse scale permeability tensor $\underline{K}^*$ from the relationship $$\langle \vec{v} \rangle = -\underline{K}^* \langle \nabla P \rangle$$

where $\langle \vec{v} \rangle$ is the volume-weighted average of velocity in the selected coarse-grid cell and $\langle \nabla P \rangle$ is the volume weighted average of pressure gradient.

6. The method of claim 1, wherein determining which of the plurality of fine grid cells are included in the selected coarse grid cell is done by constructing a mapping between the fine grid and coarse grid, and using the resulting mapping function.

7. The method of claim 1, wherein the partial inclusion criterion comprises including a fine-grid cell within a coarse-grid cell if the center of the fine-grid cell lies within the coarse-grid cell.

8. The method of claim 1, wherein the global solution is generated by sub-dividing the selected volume into two or more sub-volumes and solving the diffusion equation separately in each sub-volume, wherein the solutions are compatible between sub-volumes.

9. The method of claim 4, wherein the plurality of fine scale cells and the corresponding values of the physical property describe a geologic model of the porous medium.

10. The method of claim 1, wherein the plurality of coarse grid cells form a structured grid.

11. The method of claim 1 wherein the plurality of coarse grid cells form an unstructured grid.

12. The method of claim 1, further comprising selecting a preferred coarse grid based on pre-determined grid optimization criteria.

13. The method of claim 1, wherein the region of interest is a subsurface region.

14. The method of claim 1, wherein the global solution is saved in a computer memory or data storage device.

15. A method for producing hydrocarbons from a subsurface region, comprising:
   (a) obtaining a geologic model of the subsurface region, said model providing discrete values of a physical property of a medium for a fine-scale grid covering a selected volume constituting at least a part of the subsurface region;
   (b) obtaining a scaled-up model of the physical property suitable for use in a reservoir simulation program, said scaled-up model having been made by:
      (i) solving a diffusion equation representing a diffusive process on the fine-scale grid over the selected volume, using the fine-scale values of the physical property, thus generating a global solution;
      (ii) saving the global solution in computer memory or data storage;
      (iii) subdividing the volume into a first coarse grid, said coarse grid having fewer cells than the fine-scale grid;
      (iv) selecting a coarse-grid cell, and determining which fine-grid cells are included, in whole or in part, in the selected coarse-grid cell, using a pre-selected criterion for partial inclusion;
      (v) calculating a scaled-up value of the physical property for the selected coarse-grid cell by retrieving and using the global solution for the fine-grid cells included within the selected coarse-grid cell;
      (vi) repeating steps (iv)-(v) to calculate scaled-up values of the physical property for selected other coarse-grid cells in the selected volume of the subsurface region;
      (vii) repeating steps (iii)-(vi) for at least one more coarser grid, using the global solution retrieved from computer memory or data storage for each coarser grid; and
      (viii) selecting a preferred coarse grid based on pre-determined grid optimization criteria; and
   (c) producing hydrocarbons from the subsurface region at least partially based on reservoir simulations made using the scaled-up model of the physical property on the preferred coarse grid.

16. The method of claim 15, wherein the physical property is permeability and the global solution consists of three independent flow solutions of the diffusion equation, and averages over fine grid cells of vector quantities velocity and pressure gradient are calculated for each flow solution from which nine components of a coarse-scale permeability tensor are calculated.

17. A method for scale-up of a physical property, comprising:
   (a) using a computer, calculating fine-scale solutions to at least one equation describing the physics of a diffusive process in a media of interest, wherein the fine-scale solutions are determined for each fine-scale cell in a fine-scale grid and the fine-scale solutions are stored in a memory;
   (b) constructing a coarse grid for a portion of the media of interest, wherein the coarse grid comprises a plurality of cells;
   (c) forming at least one scaleup volume in the media of interest, wherein the scaleup volume is used to calculate the physics of a diffusive process in the media of interest on the coarse grid;
   (d) constructing a mapping between the set of fine-scale solutions and the at least one coarse grid, wherein the mapping comprises relating at least one fine-scale cell to one of the plurality of coarse grid cells;
   (e) retrieving the fine-scale solutions from the memory for each fine-scale cell relating to a coarse grid cell;
   (f) calculating an upscaled physical property for the coarse grid using the fine-scale solutions;
   (g) constructing at least one additional coarse grid for an additional portion of the media of interest, wherein the additional coarse grid comprises a plurality of cells;
   (h) iteratively repeating steps (c) to (f) for at least one additional coarser grid using the fine-scale solutions from step (a).

18. The method of claim 17, wherein the media of interest is a porous medium.

19. The method of claim 17, wherein the physical property is permeability of a porous medium, and the diffusive process is fluid flow in the porous medium.

* * * * *